United States Patent
Stolarczyk

(10) Patent No.: US 9,024,802 B2
(45) Date of Patent: May 5, 2015

(54) ELECTROMAGNETIC DETECTION AND IMAGING TRANSCEIVER (EDIT) AND ROADWAY TRAFFIC DETECTION SYSTEM

(71) Applicant: Larry G. Stolarczyk, Raton, NM (US)

(72) Inventor: Larry G. Stolarczyk, Raton, NM (US)

(73) Assignee: Stolar, Inc., Raton, NM (US)

( * ) Notice: Subject to any disclaimer, the term of this patent is extended or adjusted under 35 U.S.C. 154(b) by 276 days.

(21) Appl. No.: 13/862,379

(22) Filed: Apr. 13, 2013

(65) Prior Publication Data

US 2014/0306839 A1    Oct. 16, 2014

(51) Int. Cl.
  *G01S 13/56*   (2006.01)
  *G01V 3/12*    (2006.01)
  *G01S 13/88*   (2006.01)

(52) U.S. Cl.
  CPC ............... *G01S 13/56* (2013.01); *G01S 13/885* (2013.01); *G01V 3/12* (2013.01)

(58) Field of Classification Search
  CPC .......... G01S 13/56; G01S 13/885; G01V 3/12
  USPC ........................ 342/22, 27, 28, 114, 175, 179
  See application file for complete search history.

(56) References Cited

U.S. PATENT DOCUMENTS

| | | | |
|---|---|---|---|
| 8,072,367 B1 * | 12/2011 | Bausov et al. | 342/22 |
| 2002/0011947 A1 * | 1/2002 | Stolarczyk et al. | 342/22 |
| 2008/0218400 A1 * | 9/2008 | Stolarczyk et al. | 342/22 |
| 2014/0306839 A1 * | 10/2014 | Stolarczyk | 342/28 |

* cited by examiner

*Primary Examiner* — John B Sotomayor
(74) *Attorney, Agent, or Firm* — Richard B. Main; Main Cafe

(57) ABSTRACT

An automatic frequency control is used to keep a continuous wave (CW) transmission tuned to the resonant frequency of a resonant microwave patch antenna (RMPA). Changes in loading and the bulk dielectric constant of the mixed media in front of the RMPA will affect its resonant frequency and input impedance. A significant shift in the measured input impedance is interpreted as an object moving nearby, and the phase angle of the measured input impedance is used to estimate the direction of an object's movement.

8 Claims, 7 Drawing Sheets

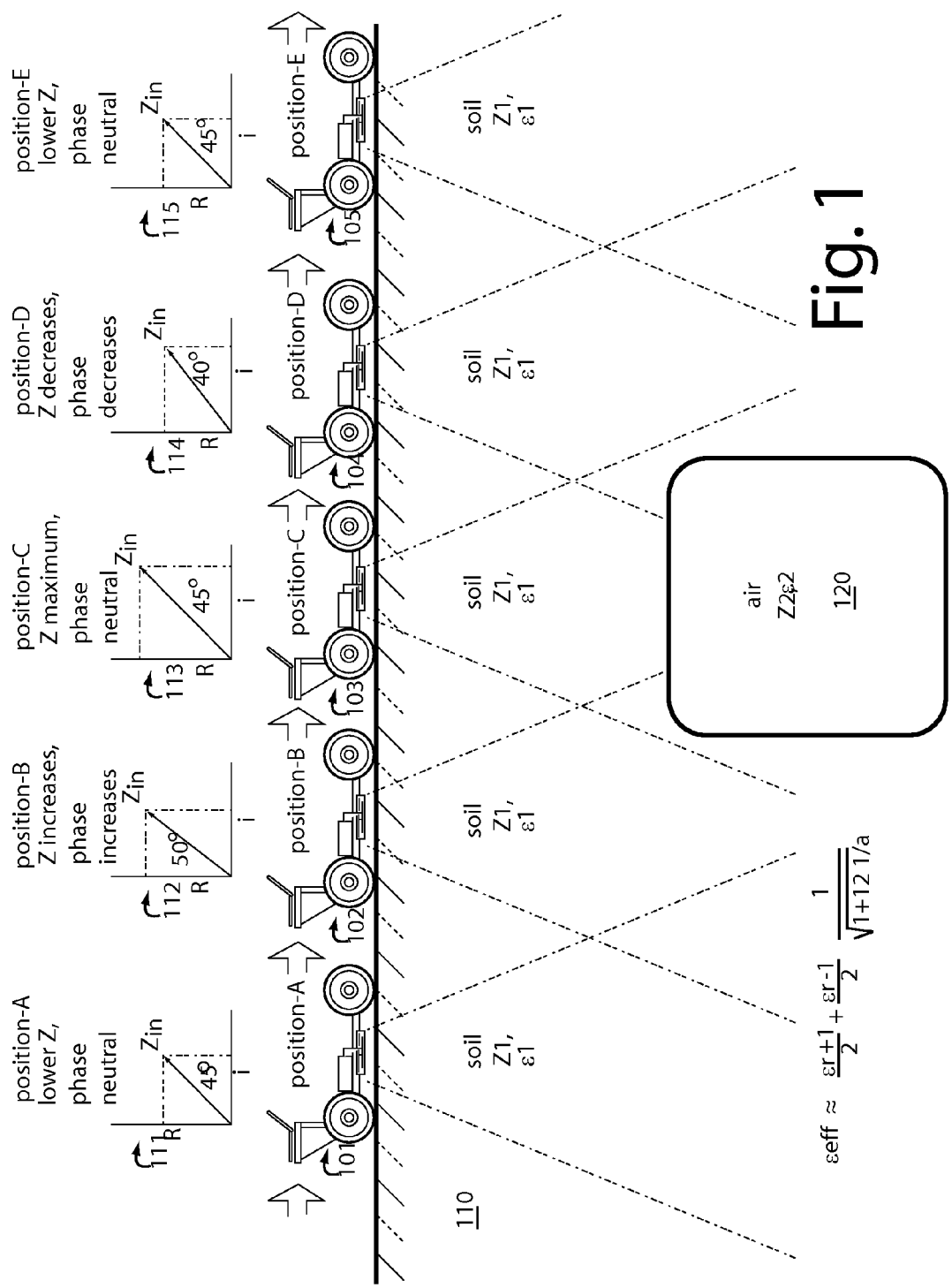

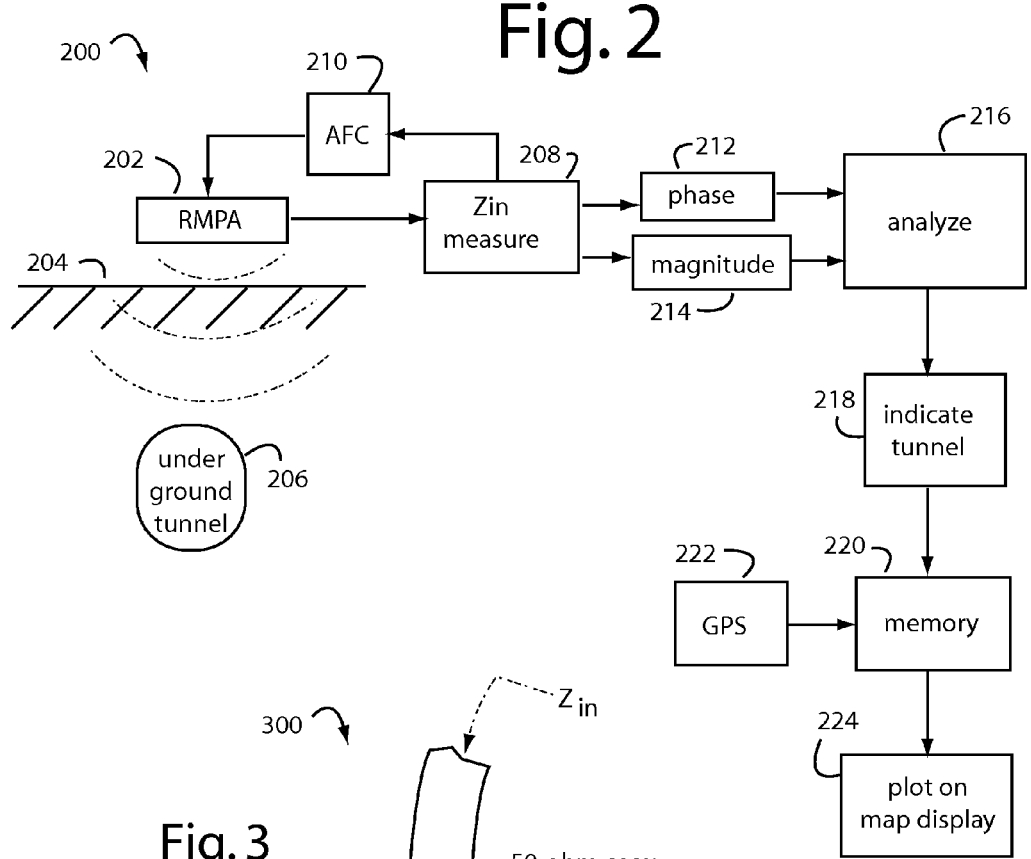
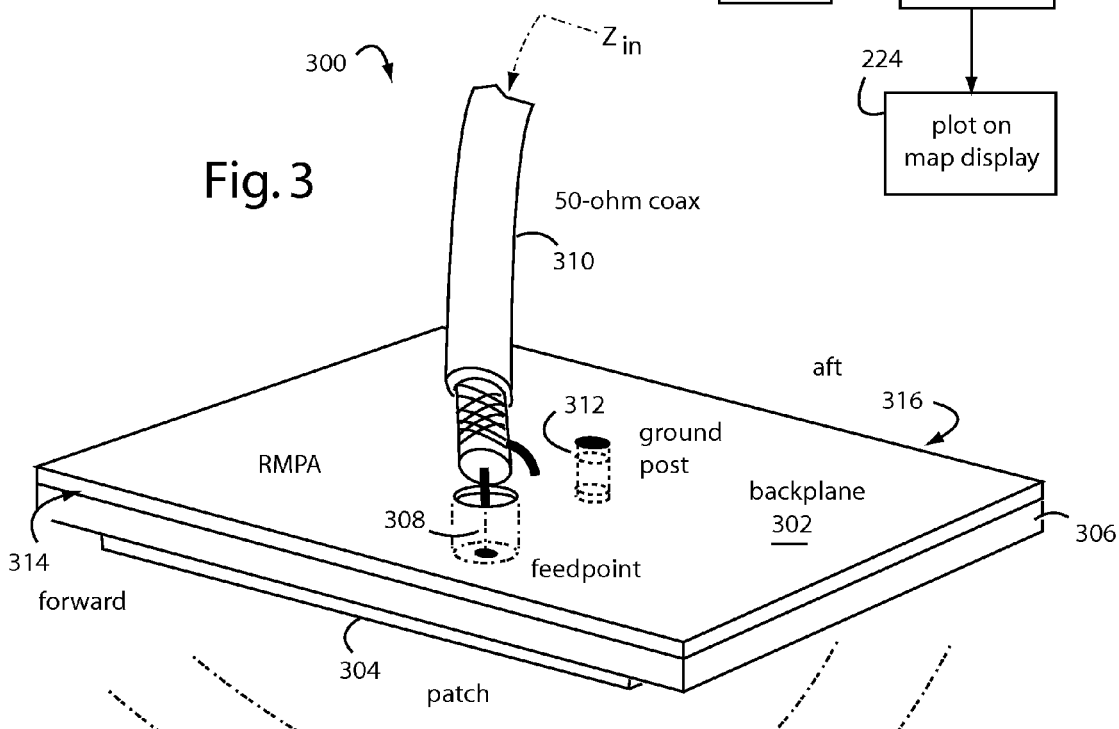

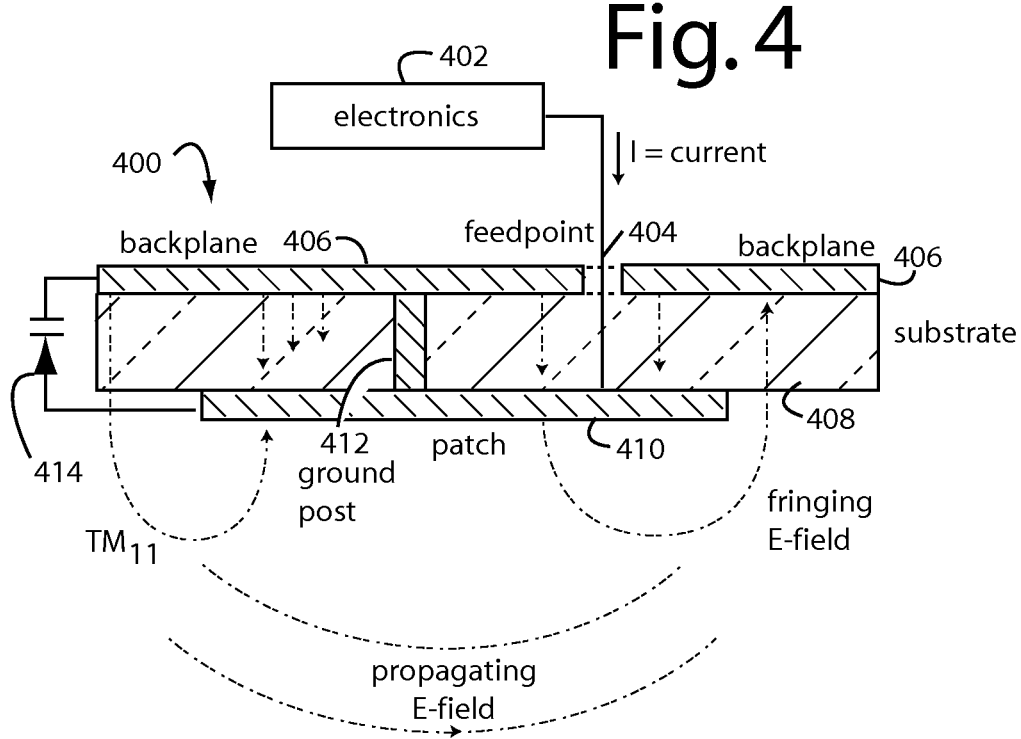

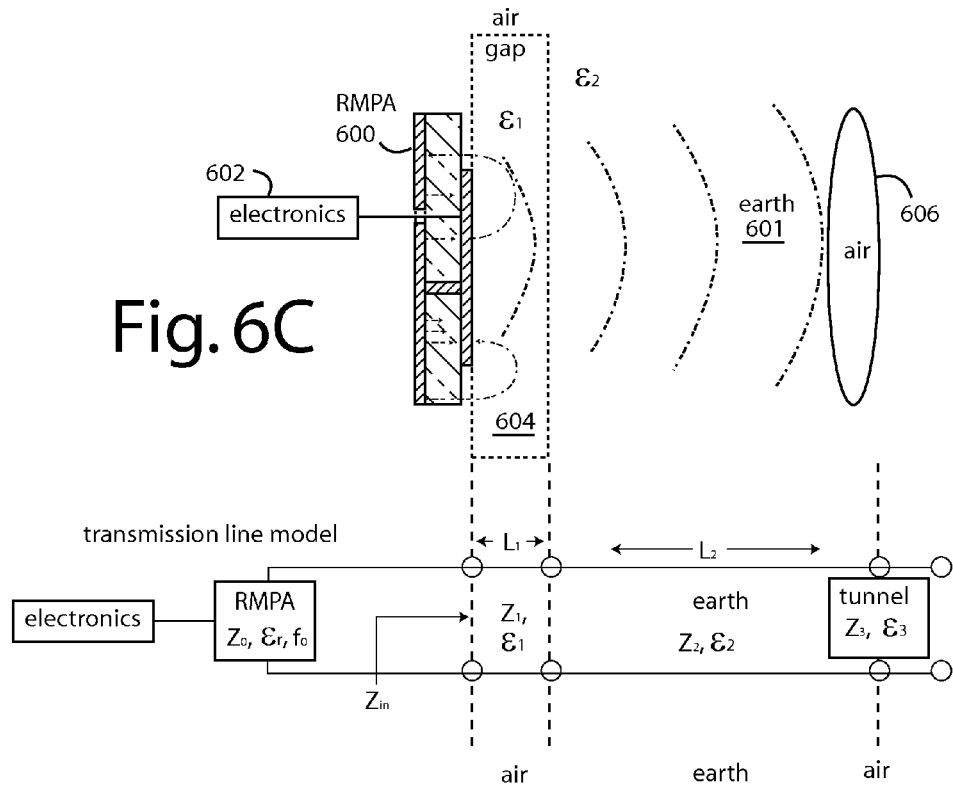
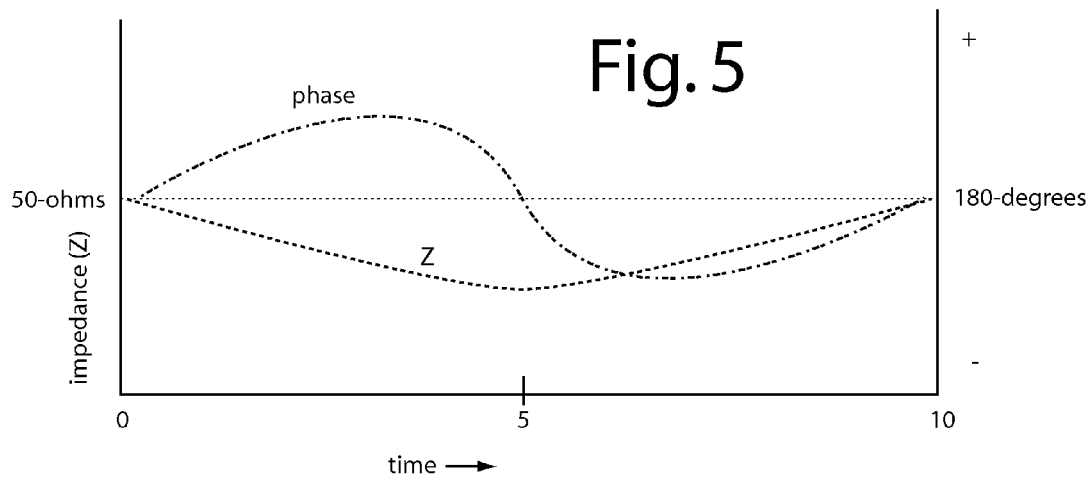

ELECTROMAGNETIC DETECTION AND IMAGING TRANSCEIVER (EDIT) AND ROADWAY TRAFFIC DETECTION SYSTEM

RELATED APPLICATIONS

This Application is a continuation-in-part of U.S. patent application Ser. No. 12/815,422, filed Jun. 15, 2010, and titled, DEEP LOOK ELECTROMAGNETIC DETECTION AND IMAGING TRANSCEIVER (EDIT) SYSTEM FOR DETECTING UNDERGROUND PASSAGEWAYS. Such parent application will issue Apr. 16, 2013 as U.S. Pat. No. 8,421,464.

FIELD OF THE INVENTION

The present invention relates to electronic sensing devices, and more particularly to sensors and systems that can detect and characterize moving objects.

DESCRIPTION OF THE PRIOR ART

The present Inventors describe a ground-penetrating radar that can look into shallow earth to find and identify landmines in U.S. Pat. No. 6,473,025, issued Oct. 29, 2002, and titled, LANDMINE LOCATING SYSTEM. Such landmines are necessarily buried shallow so they can be triggered by touch sensors on the surface, and so that the explosives are not blanketed and muffled too much by earth. But sensing other, deeper anomalies in the earth like tunnels is a far more difficult problem that needs an entirely new approach.

The present inventor discovered that resonant microwave patch antennas (RMPA) driven by continuous wave signals kept at resonance can be used as a very sensitive sensor. Changes in the dielectric character of the immediate environment will affect the loading on the RMPA and therefore manifest as changes in its complex input impedance at resonance. Movements and stationary anomalies deep in the ground can be sensed and characterized.

There is a need for a device and system that can electronically detect and characterize things through the ground.

SUMMARY OF THE INVENTION

Briefly, a detection system embodiment of the present invention uses an automatic frequency control to keep a continuous wave (CW) transmission tuned to the changing resonant frequencies of a resonant microwave patch antenna (RMPA). Changes in the RMPA loading and the bulk dielectric constant of mixed media in front of the RMPA will affect its resonant frequency and more importantly its input impedance. Various shifts in the measured input impedance of a directional RMPA over short periods are interpretable as movements of people or equipment. The phase angles of the measured input impedances can indicate the objects' positions and movements relative to the detection system.

These and other objects and advantages of the present invention will no doubt become obvious to those of ordinary skill in the art after having read the following detailed description of the preferred SPS receivers which are illustrated in the various drawing figures.

IN THE DRAWINGS

FIG. 1 is a time series diagram of a system embodiment of the present invention shown as it is rolled along the ground surface over a buried, underground tunnel;

FIG. 2 is a functional block diagram of the system of FIG. 1 showing how a downward pointed RMPA is used to obtain antenna input impedance measurements that can reveal the presence of a buried, underground tunnel;

FIG. 3 is a perspective diagram of an RMPA as used in FIGS. 1-2 and showing how the relationship of the feedpoint to the groundpost give some phase asymmetry to the effects of tunnels on the antenna input impedance measurements;

FIG. 4 is a cross sectional diagram of RMPA antennas like those in FIG. 1-3 and shows the relationships between the feedpoint, groundpost, fringing E-field, and the propagating E-field;

FIG. 5 is a graph diagram showing how the phase and magnitude of the input impedance of an RMPA can change as it is rolled on the surface over an underground passageway or tunnel;

FIGS. 6A-6C are diagrams representing the RMPA as a loaded transmission line model. FIG. 6A shows the case where the RMPA radiates into air, FIG. 6B shows the case where the RMPA radiates into air and then into the earth, and FIG. 6C shows the case where the RMPA radiates into air, down through the earth and into a tunnel filled with air;

DETAILED DESCRIPTION OF THE PREFERRED EMBODIMENT

Figure 6A:
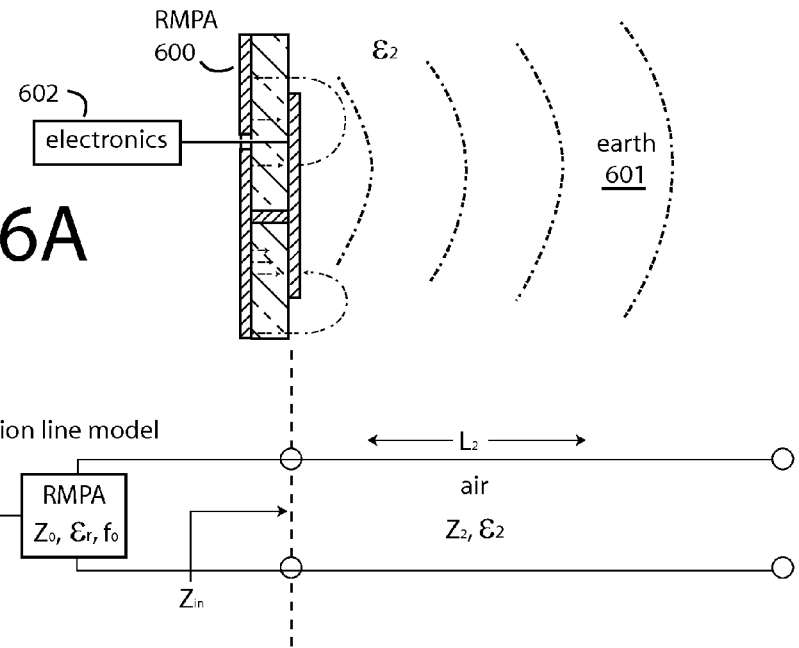

Embodiments of the present invention use automatic frequency controls (AFC) to keep a continuous wave (CW) transmission tuned to variations in the resonant frequency of a resonant microwave patch antenna (RMPA). Movements of objects-of-interest can cause relative changes in the bulk dielectric constant of mixed media seen in front of the RMPA and will thereby affect the resonant frequency and the complex input impedance ($Z_{in}$). If the RMPA is kept in resonance by AFC, then the $Z_{in}$ will faithfully track loading in the near field. Operational wavelengths of 0.5 meters to several meters can be usefully employed to detect different kinds of moving objects at a variety of ranges.

A fixed frequency CW can be used to drive an RMPA fitted with voltage variable tuning capacitors, e.g., variable capacitance diode, varicap, or varactors. The feedback control voltage is configured to constantly hunt for trim capacitance that minimizes $Z_{in}$. Once minimized, measurements of the resulting $Z_{in}$ will track loading in the near field.

In effect, the embodiments electronically measure the bulk dielectric constant of the mix of media and things in front of a directionally pointed RMPA. Such can be pointed up from buried positions in a roadway, to the side from covert embedded placements in concrete walls, or pointed down into a storage tank, pipe or mining area. If the media mix above is largely air-filled, like an empty road, then one result will be obtained. But if large objects pass by, say on a roadway, the bulk dielectric measurement of the RMPA will be significantly different. These contrasting differences can be interpreted as an indication that an object-of-interest is passing nearby. The rates and magnitudes of change can be used as clues to the nature of the things passing by. When RMPA's with resonant frequencies of 150-MHz are used, the useful sensitivity of such a system to locate objects-of-interest can reach thirty feet or more into or out of the earth.

FIG. 1 illustrates five different positions of a portable tunnel detection system embodiment of the present invention, and each position as it moves along a path over an underground passageway is referred to herein by the general reference numerals 101-105. In a first position, position-A, portable tunnel detection system 101 directionally transmits a continuous wave (CW) radio transmission from an RMPA (e.g., 202, FIG. 2) into the ground 110 at about 150-MHz. The fan of soil below will have a particular dielectric constant, $\in_1$, that will produce a load impedance $Z_1$. Such load impedance $Z_1$ will influence the input impedance $Z_{in}$ of the RMPA, and changes in the $Z_{in}$ will affect the resonant frequency of the RMPA. If the RMPA is brought back into resonance by fine tuning the frequency of the CW drive, a new minimum $Z_{in}$ will be obtained. That new minimum $Z_{in}$ is represented by impedance vector 111.

For purposes of this explanation only, we can assume the real resistance (R) and imaginary (i) components of $Z_{in}$ to be equal and the vector 111 has a 45° phase angle.

In a second position, position-B, portable tunnel detection system 102 is still transmitting the directional CW radio transmission as before into the ground 110, but now a forward fringe just catches a tunnel 120 filled with air. The air has a particular dielectric constant, $\in_2$, that will produce a load impedance $Z_2$. Such load impedance $Z_2$ will mix with load impedance $Z_1$ and together they will influence the input impedance $Z_{in}$ of the RMPA. Again, changes in the $Z_{in}$ will affect the resonant frequency of the RMPA, so it is brought back into resonance by fine tuning the frequency of the CW drive, a second new minimum $Z_{in}$ will be obtained. That new minimum $Z_{in}$ is represented by impedance vector 112.

For purposes of this explanation only, the real resistance (R) and imaginary (i) components of $Z_{in}$ have changed such that the vector 112 has a 50° phase angle. The RMPA is constructed and oriented such that the relative forward or aft placement of loads in its radiation field will affect the phase angle of $Z_{in}$ differently.

In a third position, position-C, portable tunnel detection system 103 is still transmitting the directional CW radio transmission as before into the ground 110, but now the main beam of its radiation field squarely catches tunnel 120. The highly contrasting dielectric constant, $\in_2$, will produce a maximum load impedance $Z_2$ to mix with load impedance $Z_1$. The effect will be a new maximum in the input impedance $Z_{in}$ of the RMPA. The changes in the resonant frequency of the RMPA are brought back into resonance by fine tuning the frequency of the CW drive, and a third new minimum $Z_{in}$ will be obtained. That new minimum $Z_{in}$ is represented by impedance vector 113.

For purposes of this explanation only, the real resistance (R) and imaginary (i) components of $Z_{in}$ have grown, and vector 113 has a 45° phase angle. This maximum in $Z_{in}$ and minimum in phase angle change from idle conditions indicates tunnel 120 is directly below.

In a fourth position, position-D, portable tunnel detection system 104 continues to transmit the directional CW radio transmission as before into the ground 110, but now the main beam of its radiation field has past tunnel 120 and only a fringe is catching it. The tunnel 120 is now slightly aft. The contrasting dielectric constant, $\in_2$, that produces a load impedance $Z_2$ will be proportionately less in the mix with load impedance $Z_1$. The sum will produce a new input impedance $Z_{in}$ in the RMPA represented by impedance vector 114. The changes in the resonant frequency of the RMPA are brought back into resonance by fine tuning the frequency of the CW drive, and a fourth new minimum $Z_{in}$ will be obtained.

For purposes of this explanation only, the real resistance (R) and imaginary (i) components of $Z_{in}$ have changed again, such that vector 114 has a 40° phase angle because of the nature of the construction of the RMPA. This past-the-peak measurement in $Z_{in}$ and a telltale phase angle change from previous measurements indicates tunnel 120 is now aft of the RMPA.

In a fifth position, position-D, portable tunnel detection system 105 continues to transmit the directional CW radio transmission as before into the ground 110, but now the main beam of its radiation field is well past tunnel 120. The contrasting dielectric constant, $\in_2$, that produces a load impedance $Z_2$ will drop out of the mix with load impedance $Z_1$. The sum will produce an input impedance $Z_{in}$ in the RMPA represented by impedance vector 115. The changes in the resonant frequency of the RMPA are brought back into resonance by fine tuning the frequency of the CW drive, and a fifth new minimum $Z_{in}$ will be obtained that more or less duplicates that of position-A.

For purposes of this explanation only, the real resistance (R) and imaginary (i) components of $Z_{in}$ have changed again, such that vector 114 has a 40° phase angle. This past-the-peak measurement in $Z_{in}$ and a telltale phase angle change from previous measurements indicates tunnel 120 is now aft of the RMPA.

FIG. 2 represents an electronics package 200 that can be used in portable tunnel detection systems 101-105. The electronics package 200 includes an RMPA 202 for directionally transmitting a CW signal of about 150-MHz down into the earth 204 to find an underground passageway, tunnel, or other object-of-interest 206. The RMPA 202 will be loaded by the earth 204 and air in object-of-interest 206 and its input impedance $Z_{in}$ will be affected. The input impedance $Z_{in}$ is constantly monitored by a measurement device 208 and a control signal is sent to an automatic frequency control (AFC) 210. The AFC 210 varies its output frequency in a constant hunt to find the then minimum possible in $Z_{in}$. That then minimum possible in $Z_{in}$ will be at maximum when RMPA 202 is directly over object-of-interest 206 and object-of-interest 206 is shallow enough to be an influence on $Z_{in}$.

The measurement device 208 produces two components for each new minimum in $Z_{in}$, a phase measurement 212 and a magnitude measurement 214. These are analyzed by a microcomputer analyzer 216 and compared to one another and characteristic electronic signatures for tunnels. A decision is made whether the current phase measurement 212 and magnitude measurement 214 fit the electronic profile of a tunnel or other passageway filled with air. If so, a tunnel indication 218 is issued as a message to a remote site, a local screen display, and or a sound alarm. The event is stored in a memory 220 with a location tag obtained for the present map position from a global positioning system (GPS) navigation receiver 222. A collection of such events and locations fetched from memory 220 then makes a more informative display possible on a map display screen 224.

FIG. 3 represents a way to construct a RMPA 300 using common FR4 printed circuit board material. A copper-foil backplane 302 and radiating patch 304 are separated by an epoxy substrate 306. A feedpoint 308 is drilled through the backplane 302 and substrate 306 so a 50-ohm coaxial cable can be attached to the radiating patch 304. A groundpost 312 is constructed by drilling and plating a copper via. The relationship of the feedpoint 308 to the groundpost 312 creates a forward radiating edge 314 and an aft radiating edge 316. The RMPA has a characteristic Zin and resonant frequency that are a function of the dielectric constant of substrate 306, objects in the radiated field, the separation distance of backplane 302 and patch 304, the distance between feedpoint 308 to the groundpost 312, and the plan dimension of patch 304. In the embodiments of FIGS. 1-2, these all add up to a resonant frequency of about 150-MHz and a $Z_{in}$ of about 50-ohms when the radiation field is substantially comprised of air. Varactors or other types of trimming capacitors can be added around the edges of RMPA 300 to fine-tune its resonant frequency.

In this configuration, the RMPA is fed a constant frequency and the varactors are tuned to keep it at resonance despite changes in the media environment surrounding the RMPA. The "correction" voltages sent to the varactors to keep the balance will respond proportionally to changes in the media environment. The resonance is verified by observing minimas in the $Z_{in}$. Interpretations of the placement and movements of objects-of-interest can therefore be made by tracking the correction voltages sent to the varactors.

Scattering parameters (s-parameters) describe the scattering and reflection of traveling waves when a network is inserted into a transmission line. Here, the transmission line includes the soils and the air inside a tunnel. S-parameters are normally used to characterize high frequency networks, and are measured as a function of frequency. See, National Instruments explanation at, zone.ni.com/devzone/cda/tut/p/id/2513. So frequency is implied and complex gain and phase assumed. The incident waves are designated by the letter $a_n$, where n is the port number of the network. For each port, the incident (applied) and reflected waves are measured. The reflected wave is designed by $b_n$, where n is the port number. When the incident wave travels through a network, its gain and phase are changed by the scattering parameter. For example, when wave $a_1$ travels through a network, the output value of the network is simply the value of the wave multiplied by the relevant S-parameter. S-parameters can be considered as the gain of the network, and the subscripts denote the port numbers. The ratio of the output of port-2 to the incident wave on port-1 is designated $S_{21}$. Likewise, for reflected waves, the signal comes in and out of the same port, hence the S-parameter for the input reflection is designated $S_{11}$.

For a two-port network with matched loads:

$S_{11}$ is the reflection coefficient of the input;
$S_{22}$ is the reflection coefficient of the output;
$S_{21}$ is the forward transmission gain; and
$S_{12}$ is the reverse transmission gain from the output to the input.

S-parameters can be converted to impedance by taking the ratio of $(1+S_{11})$ to $(1-S_{11})$ and multiplying the result by the characteristic impedance, e.g., 50-ohms or 75-ohms. A Smith chart can be used to convert between impedance and S-parameters.

The frequency and impedance, or reflection coefficient $(S_{11})$, of RMPA 300 are measured to provide sensor information and interpretive reports. RMPA 300 is electronically tuned by a sensor controller either adjusting oscillator frequency and/or varactors to find the resonant frequency of the RMPA each time a measurement is taken. The $S_{11}$ (reflection coefficient) parameter is measured in terms of magnitude. The sensor controller seeks to minimize the magnitude of $S_{11}$, meaning RMPA 300 is near its resonant point and 50-ohms.

During an automatic steady state calibration, an iterative process is used in which a sensor controller seeks a minimum in $S_{11}$ by adjusting the applied frequency through an oscillator. Once a frequency minimum for $S_{11}$ is found, sensor controller adjusts a bias voltage on varactors connected to the edges of RMPA 300. The voltage variable capacitances of varactors are used to fine tune RMPA 300 into resonance, and this action helps drive the impedance as close to 50-ohms as possible. Sensor controller simply measures the $S_{11}$ magnitude minimum. Once voltage adjustments to varactors find a minimum in $S_{11}$ magnitude, the process is repeated with very fine adjustment steps in an automatic frequency control to find an even better minimum. The voltages to varactors are once again finely adjusted to optimize the minimum.

After calibration, an independent shift away from such minimum in $S_{11}$ magnitude means an air volume is affecting the balance. The reflection coefficient $(S_{11})$ will change away from the original "calibrated" resonance value. Typically a buried tunnel passing within the field will cause a peak maximum in the measured data. The rate of change of the measured signal in the area is directly related to the speed of the vehicle carrying RMPA 300.

$S_{11}$ has both magnitude and phase, a real and imaginary part. Changes in magnitude indicate a disturbance in the EM-field of RMPA 300, and changes in the phase provide the directionality of travel 110-113. RMPA 300 is a linearly polarized antenna, the fields on one edge of RMPA 300 are 180-degrees out of phase from the field on the other edge. With a proper alignment of RMPA 300 in situ, people passing in front of RMPA 300 from left to right, for example in FIG. 1, will produce a phase signature that is 180-degrees out of phase from other people moving right to left. The phase at resonance can be corrected to provide a constant 180-degree shift.

FIG. 4 schematically represents an RMPA 400 like those in FIGS. 1-3. RMPA 400 is connected to an electronics controller 402 through a feedpoint 404 with a characteristic impedance of 50-ohms. Such feedpoint 404 passes through a small opening, e.g., on a copper-foil backplane 406 on a fiberglass-epoxy FR4 substrate 408. A copper-foil patch 410 is deposited on the substrate 408 and has a ground connection to the backplane 406 through a ground post 412. The view of FIG. 4 is taken through a normal plane that longitudinally bisects both the ground post 412 and feedpoint 404. A varactor 414 is typical of many that can be connected to be voltage-controlled by electronics controller 402 to enable fine tuning of the resonant frequency of RMPA 400 to help with calibration and measurement sensing. The electronics controller 402 is able to measure parameter $S_{11}$ at the feedpoint 404 and issue interpretive reports to users.

At resonance, the electromagnetic fields radiate away from RMPA, as shown in FIG. 4. A linearly polarized electric field fringes from the edges of the metalized, copper foil parts of RMPA 400. Such type of polarization is an important operational element of system 100 of FIG. 1, this polarization enables an indication of forward or aft for any tunnels being detected. As applied here, the antenna radiation pattern has a very broad 3-dB beam width of ±30 degrees from the perpendicular to the plane of patch 410. This pattern is important in the present applications because the wide antenna pattern allows a large area to be electronically swept.

FIG. 5 represents an exemplary case in which tunnel 120 is passed over by system 101-105 (FIG. 1) from out of range, then into range, then directly under the RMPA (e.g., 202 in FIG. 2), and then out the other side out of range. For example, a transit time of ten seconds. Such transition begins out-of-range at time=0, the tunnel passes under the RMPA at time=5, and goes out-of-range on the other side at time=10. A change in loading is caused by the changing positions and nearness of the tunnel 120 from time=0 to time=10, and the resonant frequency of the RMPA is affected. So each new resonant frequency is found by controlling the frequency with AFC 210 to produce a minimum in the input impedance of the RMPA.

That new impedance is the measurement that is collected at that particular time, and a series of such measurements is represented in FIG. 5. The ± phase of the impedance-Z tells which edge of the RMPA the tunnel is on, and the magnitude of impedance-Z tells how near the tunnel is. A peak in the magnitude will also be proportional to how large the tunnel is.

Equation (5) and the associated definitions of the variables therein indicate that the RMPA is actually making a bulk dielectric constant measurement. This performance aspect is important because, even though the transmission model relies on the theory of small reflections to balance the system, the bulk dielectric measurement concept eliminates the need for any analysis requiring reflection phenomena, which is a characteristic of radar-based systems.

FIG. 6A represents a side-view of a RMPA 600 radiating into soils or earth 601. A transmission line model can be used to describe the problem, and such are included at the bottoms of FIG. 6A-6C. An RMPA electronics package 602 is configured to monitor the resonant frequency ($f_o$) and the resonant impedance ($Z_o$) parameters of RMPA 600. The resonant frequency is approximated by, $$f_O = \frac{kc}{2\pi a \sqrt{\varepsilon_{eff}}}, \quad (1)$$

where, k is a constant based on the RMPA operational mode ($TM_{11}$);

c is the speed of light;

a is the aperture area of the RMPA; and $\varepsilon_{eff}$ is the effective dielectric constant of the material in front of the RMPA.

The resonant impedance of RMPA 600 will be, $$Z_{in} = Z_O \left[ \frac{Z_2 + jZ_O \tan\beta L_2}{Z_O + jZ_2 \tan\beta L_2} \right], \quad (2)$$

where, $Z_o$ is the impedance of the RMPA (e.g., 50Ω);

$$Z_2 = \sqrt{\frac{\mu_2}{\varepsilon_2}}$$

is the wave impedance in the media;

$\mu_2$ is the magnetic permeability and for almost all cases $\mu_2=1$;

$\varepsilon_2$ is the dielectric constant of the media;

$$\beta = \frac{2\pi}{\lambda}$$

is the phase constant in the media;

$$\lambda = \frac{c}{f_o \sqrt{\varepsilon_2}}$$

is the wavelength of the signal in the media; and $L_2$=the lateral distance away from the RMPA.

For Equations (1) and (2), the resonant frequency and impedance are directly dependent upon the effective dielectric constant of the media.

Figure 6B:
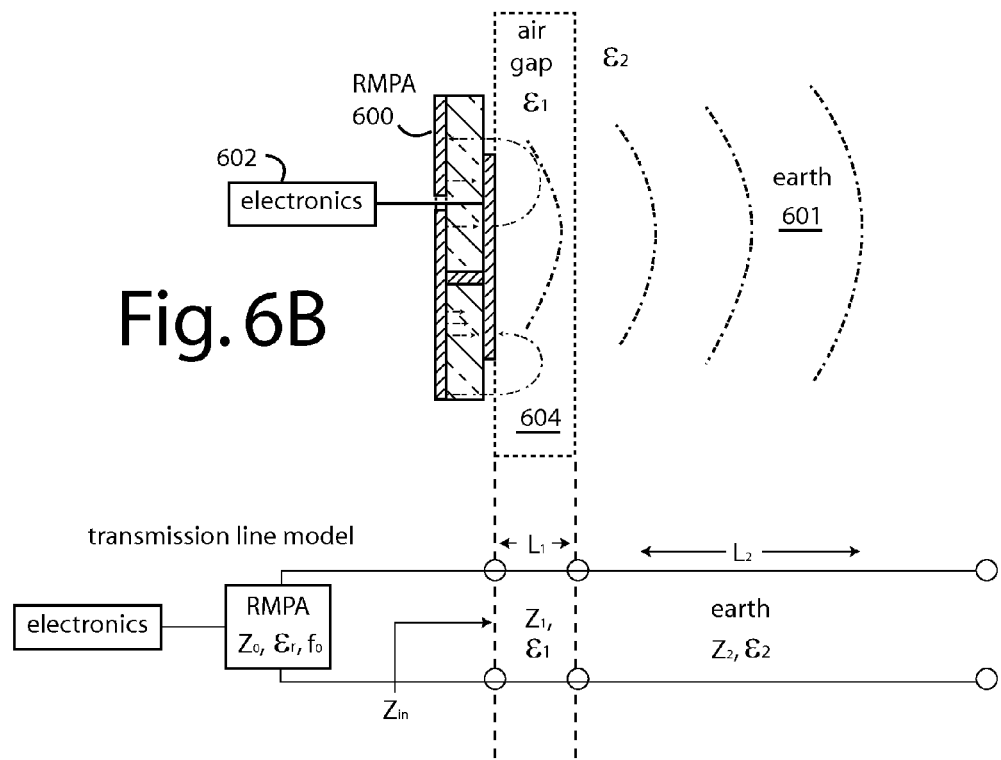

FIG. 6B takes the next step, RMPA 600 is suspended over the ground and an air gap 604 intervenes with the earth 601 below. In this case, the equations for the resonant frequency and impedance differ from Equations (1) and (2) in that the effective dielectric constant of Equation (1) becomes instead, $$\varepsilon_{eff} \propto \frac{\varepsilon_{eff1} \varepsilon_{eff2}}{\varepsilon_{eff1} + \varepsilon_{eff2}}, \quad (3)$$

where, $\varepsilon_{eff}$ is the effective dielectric constant as given in FIG. 6A, and, $$\varepsilon_{eff2} = \frac{\varepsilon_r + \varepsilon_1}{2} + \frac{\varepsilon_r - \varepsilon_1}{2} \left[ \frac{1}{\sqrt{1 + 12/a}} \right].$$

The resonant impedance of RMPA 600 shown in FIG. 6B now takes the form, $$Z_{in} = Z_O \left[ \frac{Z_l + jZ_O \tan\beta L_1}{Z_O + jZ_l \tan\beta L_1} \right], \quad (4)$$

where, $Z_o$ is the impedance of the RMPA (e.g., 50Ω);

$L_1$ is the thickness of the air gap 604;

$$Z_l = Z_1 \left[ \frac{Z_2 + jZ_1 \tan(\beta L_2)}{Z_1 + jZ_2 \tan(\beta L_2)} \right];$$

$$Z_1 = \sqrt{\frac{\mu_1}{\varepsilon_1}};$$

$$Z_2 = \sqrt{\frac{\mu_2}{\varepsilon_2}};$$

and $L_2$=the lateral, linear depth dimension of the earth being scanned.

There are direct relationships with the effective dielectric constant for both the resonant frequency and the resonant impedance. Any changes appearing in the dielectric constant will be reflected mainly in changes in the resonant parameters.

FIG. 6B represents the steady state conditions for which electronics 602 would calibrate automatically to RMPA 600.

FIG. 6C extends FIG. 6B by introducing a tunnel 608 into earth 601 within the detection range of RMPA 600. The resonant frequency is still provided by Equation (1), but the effective dielectric constant will now be, $$\frac{1}{\varepsilon_{eff}} = \frac{1}{\varepsilon_{eff1}} + \frac{1}{\varepsilon_{eff2}} + \frac{1}{\varepsilon_{eff3}}, \quad (5)$$

where, $$\varepsilon_{eff3} = \frac{\varepsilon_2 + \varepsilon_3}{2} + \frac{\varepsilon_2 - \varepsilon_3}{2} \left[ \frac{1}{\sqrt{1 + 12/a_3}} \right];$$

Here, $a_3$ is the size of the RMPA aperture at a position $L_1+L_2$ away from RMPA 600;

$$\varepsilon_{\mathit{eff}2} = \frac{\varepsilon_1 + \varepsilon_2}{2} + \frac{\varepsilon_1 - \varepsilon_2}{2}\left[\frac{1}{\sqrt{1+12/a_2}}\right];$$

And, $a_2$ is the size of the RMPA aperture at a position $L_1$ away from RMPA 600; and $$\varepsilon_{\mathit{eff}1} = \frac{\varepsilon_r + \varepsilon_1}{2} + \frac{\varepsilon_r - \varepsilon_1}{2}\left[\frac{1}{\sqrt{1+12/a}}\right].$$

For the case shown in FIG. 6C, the resonant impedance of RMPA 600 will be, $$Z_{in} = \frac{Z_O Z_B}{Z_O + Z_B}, \quad (6)$$

where, $Z_o$ is the impedance of the RMPA (e.g., 50Ω);

$$Z_B = Z_1\left[\frac{Z_A + jZ_1\tan(\beta L_1)}{Z_1 + jZ_A\tan(\beta L_1)}\right];$$

$L_1$ is the thickness of the air gap;

$$Z_1 = \sqrt{\frac{\mu_1}{\varepsilon_1}}$$

is the wave impedance in air;

$$Z_A = Z_2\left[\frac{Z_3 + jZ_2\tan(\beta L_2)}{Z_2 + jZ_3\tan(\beta L_2)}\right];$$

$L_2$ is the distance to the tunnel from the air gap;
$Z_2$ is the wave impedance in earth; and $$Z_3 = \sqrt{\frac{\mu_3}{\varepsilon_3}}$$

is the wave impedance of the air in the tunnel.

The tunnel air 606 appears as a very high impedance path for signals from RMPA 600. It is a virtual open, which means that less of the energy of the RMPA signal will be reflected back to the source. Therefore, a RMPA-based sensor system can be employed as a highly sensitive detector of air voids, such as in tunnels.

The electronics 602 constantly measures the resonant frequency and the resonant impedance of RMPA 600. A large air volume passing under the RMPA sensor will dramatically change these characteristics. Since the impedance is a complex number, having a distinct magnitude and phase, the directionality of motion can be determined.

In conventional radar applications, a relatively large signal is transmitted with the hope of measuring a relatively faint return signal. One difficulty in operating a radar type system in a subsurface infrastructure environment is a small signal of interest has to be extracted from many, often stronger reflected signals arriving at the receiver. Radar systems are effectively blind in applications in which the return signal from a first interface can swamp the receiver, leaving the radar unable to detect anything else that may be near the radar antenna.

Embodiments of the present invention do not have such limitations. The RMPA's here and their associated electronics are not used to detect small signals in the presence of very large signals. Instead, the RMPA's are used to make repetitive and continuous measurements of changes in the bulk dielectric constant as targets of interest pass under.

The physical size of the RMPA needed to match operation at resonance can vary quite a lot over the range of 50-MHz to 300-MHz. The size of RMPA 202, 300, and 600 also depends on the dielectric constant of the substrate materials used in constructing it. Typically, the dimension of the metalized surface of the RMPA can be approximated as one quarter (¼) wavelength ($\lambda$) in the dielectric. Roughly, $D=\lambda/4*1/\sqrt{\in}$, where $\lambda=c/f$, $\in$ is the dielectric constant of the substrate material, c is the speed of light, and f is the frequency.

The higher the frequency, the smaller physically will be the RMPA. The higher the dielectric constant of the substrate material used in the RMPA, the smaller the RMPA has to be for resonant operation. However, at higher frequencies, the depth of penetration will be reduced because of attenuation. And, at higher dielectric constants for the substrate materials used, RMPA becomes less efficient and has much higher Q. So the right balance will be dictated by the particular application will usually have to be empirically determined. In a prototype system that was built, the RMPA had to resonate at 150-MHz. Using standard printed circuit board copper clad FR4 material for the substrate, the resulting RMPA was about eighteen inches in diameter.

The physical orientation of the RMPA is important relative to the line of travel of the vehicle used over the tunnels. RMPA 202, 300, and 600, for example, radiates off only two of its edges, whether it is a square patch, a rectangular patch, or even a circular patch. Every RMPA has a feedpoint, and here the feedpoint connects to a phase detector and an impedance detector. The radiating edges of the patch are the ones that form "perpendicular" lines with the axis of the feedpoint through the physical center point of the patch. Drawing an imaginary line from the feedpoint to the center of the patch, the edges of the patch that are tangent to such line are the radiating edges. Radiation from these edges produces a linear polarization, and this is the axis for which phase affects are the most pronounced. RMPA's 202, 300, and 600 are positioned such that their movement relative to object-of-interest 206 is longitudinal to the imaginary line drawn from the feedpoint to the center of the patch. Such radiating edges are turned to be perpendicular to the expected directions of people travel. Inside a pipe, that can only be along the inside of the pipe. Two RMPA's set at right angles to one another could be used in spaces not so restricted.

Scattering parameters (s-parameters) describe the scattering and reflection of traveling waves when a network is inserted into a transmission line. Here, the transmission line is the air gap 604, the earth 601, and the air inside tunnel 606. S-parameters are normally used to characterize high frequency networks, and are measured as a function of frequency. See, National Instruments explanation at, zone.ni-.com/devzone/cda/tut/p/id/2513. So frequency is implied and complex gain and phase assumed. The incident waves are designated by the letter $a_n$, where n is the port number of the network. For each port, the incident (applied) and reflected waves are measured. The reflected wave is designed by $b_n$, where n is the port number. When the incident wave travels through a network, its gain and phase are changed by the scattering parameter. For example, when wave $a_1$ travels through a network, the output value of the network is simply the value of the wave multiplied by the relevant S-parameter. S-parameters can be considered as the gain of the network, and the subscripts denote the port numbers. The ratio of the output of port-2 to the incident wave on port-1 is designated $S_{21}$. Likewise, for reflected waves, the signal comes in and out of the same port, hence the S-parameter for the input reflection is designated $S_{11}$.

For a two-port network with matched loads:
$S_{11}$ is the reflection coefficient of the input;
$S_{22}$ is the reflection coefficient of the output;
$S_{22}$ is the forward transmission gain; and
$S_{22}$ is the reverse transmission gain from the output to the input.

S-parameters can be converted to impedance by taking the ratio of $(1+S_{11})$ to $(1-S_{11})$ and multiplying the result by the characteristic impedance, e.g., 50-ohms or 75-ohms. A Smith chart can be used to convert between impedance and S-parameters.

The frequency and impedance, or reflection coefficient $(S_{11})$, of RMPA 202, 300, and 600 are measured to provide sensor information and interpretive reports. RMPA 202, 300, and 600 is electronically tuned by a sensor controller either adjusting oscillator frequency and/or varactors to find the resonant frequency of the RMPA each time a measurement is taken. The $S_{11}$ (reflection coefficient) parameter is measured in terms of magnitude. The sensor controller seeks to minimize the magnitude of $S_{11}$, meaning RMPA 202, 300, and 600 is near its resonant point and 50-ohms.

During an automatic steady state calibration, an iterative process is used in which sensor controller seeks a minimum in $S_{11}$ by adjusting the applied frequency. Once a frequency minimum for $S_{11}$ is found, sensor controller adjusts a bias voltage on varactors 121 and 122 connected to the edges of RMPA 202, 300, and 600. The voltage variable capacitances of varactors are used to fine tune RMPA 202, 300, and 600 into resonance, and this action helps drive the impedance as close to 50-ohms as possible. Sensor controller simply measures the $S_{11}$ magnitude minimum. Once voltage adjustments to varactors find a minimum in $S_{11}$ magnitude, the process is repeated with very fine adjustment steps in frequency control to find an even better minimum. The voltages to varactors are once again finely adjusted to optimize the minimum.

After calibration, an independent shift away from such minimum in $S_{11}$ magnitude means a tunnel passing underneath is affecting the balance. The reflection coefficient $(S_{11})$ will change away from the original "calibrated" resonance value. Typically a person passing within the field will cause a peak maximum in the measured data. The rate of change of the measured signal in the area is directly related to the speed of the person passing through the fields of lobes 125 and 126.

$S_{11}$ has both magnitude and phase, a real and imaginary part. Changes in magnitude indicate a disturbance in the EM-field of RMPA 202, 300, and 600, and changes in the phase provide the directionality of travel. RMPA is a linearly polarized antenna, the fields on one edge of RMPA are 180-degrees out of phase from the field on the other edge. With a proper alignment of RMPA in situ, tunnels passing under RMPA 202, 300, and 600 from front to back, for example in FIG. 1, will produce a phase signature. The phase at resonance can be corrected to provide a constant 180-degree shift.

The response versus distance is not linear, but the changes in RMPA electrical properties are linear with linear increases in bulk dielectric changes. In other words, with this, the system can be set to ignore changes below a certain threshold until the threshold associated with a human is detected.

Inventors Larry G. Stolarczyk and Gerald Stolarczyk described a practical way to implement some of electronics equipment that can be adapted for use here in the present invention. See, U.S. Pat. No. 6,633,252, issued Oct. 14, 2003, and titled Radar Plow Drillstring Steering.

Figure 7:
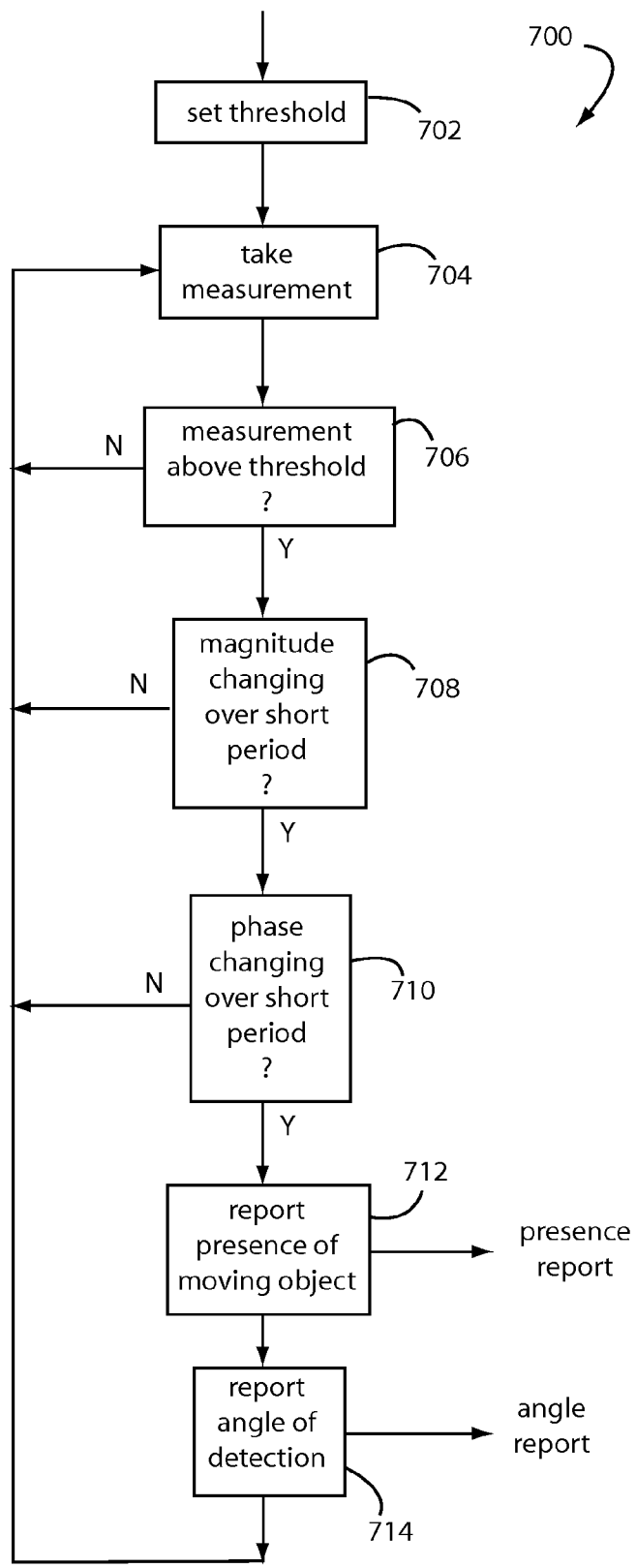
FIG. 7 is a flowchart diagram of a method embodiment of the present invention.

FIG. 7 represents a computer program 700 in an embodiment of the present invention for a microcomputer that when executed performs the functions of the analyzer 216 in FIG. 2 and electronics 602 in FIGS. 6A-6 C. Any changes in magnitude and phase of the input impedance $(Z_{in})$ of the RMPA that occur, e.g., tunnel 120 or 606 passing under the RMPA's of FIGS. 1 and 6C are analyzed. A subroutine 702 allows a user to set the minimum trigger threshold so that the system will not respond to small anomalies. A subroutine 704 uses the electronics disclosed in FIGS. 1-6C to obtain an input impedance $(Z_{in})$ of the RMPA. Such measurement include the magnitude and phase of the $Z_{in}$. A subroutine 706 tests the magnitude of the $Z_{in}$ to see if it exceeds a threshold magnitude change. If not, computer program 700 returns to subroutine 704 to take more measurements of $Z_{in}$. If yes, a subroutine 708 analyzes the present and recent measurements of $Z_{in}$ to see if the magnitude of $Z_{in}$ is changing over a relatively short period of time, e.g., one second. If not, computer program 700 returns to subroutine 704 to take more measurements of $Z_{in}$. If yes, a subroutine 710 analyzes the present and recent measurements of $Z_{in}$ to see if the phase of $Z_{in}$ is changing over a relatively short period of time, e.g., one second. If not, computer program 700 returns to subroutine 704 to take more measurements of $Z_{in}$. If yes, a subroutine 712 reports or annunciates to a local or remote user that a tunnel has passed under the RMPA.

A subroutine 714 further reports an angle relative to the RMPA. The angle is ascertained from the phase measurements of $Z_{in}$, and how they correlate to magnitude measurements at the same instants. The computer program 700 then loops around to subroutine 704 to take more measurements of $Z_{in}$. Each measurement of $Z_{in}$ is obtained while the RMPA is in resonance. AFC 210 (FIG. 2) continually hunts for the optimal frequency that will produce a minimum $Z_{in}$. The minimum obtainable $Z_{in}$ will change as tunnels pass under RMPA 202, 300, and 600.

Angle information can be used with tomographic calculations to improve tunnel detection and location by increasing the number of data points contributing to the analysis.

A method embodiment of the present invention for detecting any underground passageways includes radiating the earth and an underground passageway with a resonant microwave patch antenna (RMPA). The frequency of a continuous wave (CW) transmission applied to the RMPA in real-time is maintained to match the resonant frequency of the RMPA as it changes with variations in the loading caused by the earth and any underground passageways. Each minimum in the instantaneous input impedance of the RMPA is interpreted as an indication of its being operated at its resonant frequency given how it is loaded. Underground passageways are announced after analyzing how the instantaneous input impedance of the RMPA changes with changes in position of the RMPA on the surface in a local area. The relative direction of the underground passageway can be further determined by analyzing how the phase angle of the instantaneous input impedance of the RMPA changes.

Figure 8:
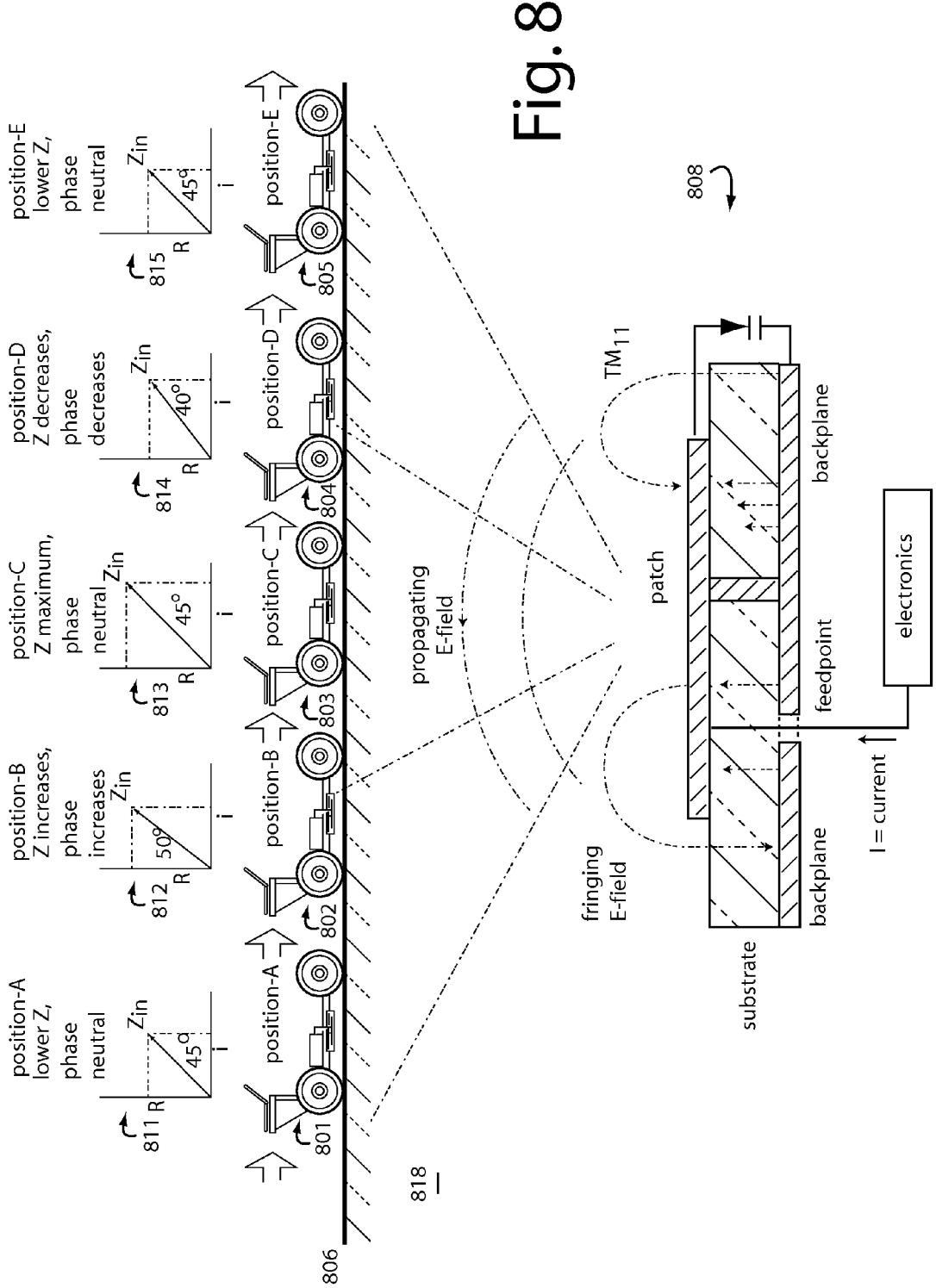
FIG. 8 is a time series showing a moving object rolling along a roadway in a roadway traffic detection system embodiment of the present invention.

FIG. 8 represent a time series showing a moving object 801-805 rolling along a roadway 806 in a roadway traffic detection system 808 in an embodiment of the present invention. Complex impedance graphs 811-815 represent the corresponding changes in input impedance Zin as observed by an RMPA (Like 400 in FIG. 4) buried in the earth 818.

Although the present invention has been described in terms of the presently preferred SPS receivers, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. An object detection system, comprising:
    a resonant microwave patch antenna (RMPA) with an active face characterized by responses in its complex input impedance ($Z_{in}$) and resonant frequency to relative changes in the bulk dielectric constant loading caused by a movement of objects proximate to said active face, wherein the RMPA reacts differently to dielectric changes in its fringing and propagating e-fields according to relative direction;
    an automatic control configured to minimize the $Z_{in}$ of the RMPA while a continuous wave (CW) drive is applied to the RMPA by maintaining a state of resonance despite any media variations and movements of said objects proximate to said active face; and
    an interpretive device for measuring and interpreting shifts in the input impedances and the phase angles of the RMPA as indications of the sizes, positions, and speeds of objects-of-interest relative to the face of the RMPA.

2. The object detection system of claim 1, further comprising:
    a varactor connected to RMPA in such a way that the resonant frequency of the RMPA can be trimmed by a control voltage.

3. A roadway traffic detection system, comprising:
    a resonant microstrip patch antenna (RMPA) configured to be buried and hidden in a roadway, wherein the RMPA reacts differently to dielectric changes in its fringing and propagating e-fields according to relative direction of objects above its active face;
    a sensor controller connected to the RMPA to drive the RMPA with a variable frequency, and to measure the impedance and phase ($Z_{in}$) of the RMPA while keeping the RMPA at frequency resonance; and
    an interpretive device that deduces particular changes in the resonant frequency, impedance, and phase of the RMPA as the size, direction, and speed of objects passing overhead;
    wherein, objects near the RMPA affect the dielectric constant and thereby also affect the resonant frequency, impedance, and phase of the RMPA.

4. The roadway traffic detection system of claim 3, wherein a phase change is indicative of an angle relative to the RMPA, and a delta frequency and impedance change indicates the size and proximity to the RMPA.

5. The roadway traffic detection system of claim 4, further comprising:
    a threshold detector to screen out any false positives;
    wherein, an interpretation of changes in resonant frequency, impedance, or phase of $Z_{in}$, is output to annunciate the locating of a tunnel.

6. The roadway traffic detection system of claim 3, further comprising:
    a device for using angle information with tomographic calculations to improve object detection and location by increasing the number of data points contributing to each analysis.

7. A method for detecting movements of objects, comprising:
    radiating an area with a resonant microwave patch antenna (RMPA):
    maintaining the frequency of a continuous wave (CW) transmission applied to the RMPA in real-time to match the resonant frequency of the RMPA as it changes with variations in its loading;
    interpreting a minimum in the instantaneous input impedance of the RMPA as an indication of its being operated at its resonant frequency given how it is loaded; and
    announcing the presence of objects moving nearby by analyzing how the instantaneous input impedance of the RMPA changes over time.

8. The method of claim 7, further comprising:
    announcing the relative direction of moving objects by analyzing how the phase angle of the instantaneous input impedance of the RMPA changes over time.

* * * * *